United States Patent
Weber et al.

(10) Patent No.: US 7,153,358 B2
(45) Date of Patent: *Dec. 26, 2006

(54) PIGMENT PREPARATIONS BASED ON DIKETOPYRROLOPYRROLE PIGMENTS FOR THE UNDISTORTED PIGMENTATION OF PARTIALLY CRYSTALLINE PLASTICS

(75) Inventors: Joachim Weber, Frankfurt am Main (DE); Thomas Hundsdorf, Weiterstadt (DE); Matthias Ganschow, Wiesbaden (DE)

(73) Assignee: Clariant GmbH, Frankfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/523,676

(22) PCT Filed: Jul. 2, 2003

(86) PCT No.: PCT/EP03/07025

§ 371 (c)(1),
(2), (4) Date: Feb. 2, 2005

(87) PCT Pub. No.: WO2004/018566

PCT Pub. Date: Mar. 4, 2004

(65) Prior Publication Data

US 2006/0052490 A1    Mar. 9, 2006

(30) Foreign Application Priority Data

Aug. 3, 2002 (DE) .............................. 102 35 573

(51) Int. Cl.
C09B 67/22 (2006.01)
C09B 57/00 (2006.01)
C08K 5/3415 (2006.01)

(52) U.S. Cl. ............ 106/498; 106/31.78; 430/105; 430/108.2; 524/87; 524/92; 524/94

(58) Field of Classification Search .......... 106/498, 106/31.78; 430/105, 108.2; 524/87, 92, 524/94

See application file for complete search history.

(56) References Cited

U.S. PATENT DOCUMENTS

| | | | |
|---|---|---|---|
| 4,579,949 A | 4/1986 | Rochat et al. | |
| 4,791,204 A | 12/1988 | Jost et al. | |
| 4,880,472 A | 11/1989 | Bugnow et al. | |
| 4,889,562 A | 12/1989 | Bugnon et al. | |
| 5,271,759 A | 12/1993 | Wooden et al. | |
| 5,274,010 A | 12/1993 | Bugnon et al. | |
| 5,401,780 A | 3/1995 | Bugnon et al. | |
| 5,472,495 A | 12/1995 | Schroeder | |
| 5,522,925 A | 6/1996 | Chassot et al. | |
| 5,560,760 A | 10/1996 | Toeppen et al. | |
| 6,180,694 B1 | 1/2001 | Bugnon et al. | |
| 6,288,142 B1 | 9/2001 | Bugnon et al. | |
| 6,918,958 B1 | 7/2005 | Weber et al. | |
| 7,045,637 B1 | 5/2006 | Weber et al. | |
| 2001/0008912 A1 | 7/2001 | Weber et al. | |
| 2004/0177790 A1* | 9/2004 | Weber et al. | 106/499 |

FOREIGN PATENT DOCUMENTS

| | | |
|---|---|---|
| CA | 2269587 | 10/1999 |
| CA | 2321150 | 10/1999 |
| DE | 4037556 | 5/1991 |
| DE | 4214868 | 11/1992 |
| DE | 4313090 | 10/1994 |
| DE | 19958181 | 6/2001 |
| DE | 10106147 | 8/2002 |
| EP | 0094911 | 11/1983 |
| EP | 0243304 | 10/1987 |
| EP | 0296107 | 12/1988 |
| EP | 0466646 | 1/1992 |
| EP | 0659840 | 6/1995 |
| EP | 0952183 | 10/1999 |
| EP | 1104789 | 6/2001 |
| EP | 001104789 A2 * | 6/2001 |
| GB | 2238550 | 6/1991 |
| WO | WO 0248269 | 6/2002 |

OTHER PUBLICATIONS

U.S. Appl. No. 10/502,840, filed Jul. 28, 2004, Metz et al.
U.S. Appl. No. 10/569,112, filed Feb. 21, 2006, Ganschow et al.
PCT ISR for PCT/EP 03/07025, Nov. 25, 2003.
English Abstract for JP Application 01161905, Feb. 5, 1991.
English Translation of PCT IPER for PCT/EP 03/07025, Apr. 7, 2005.

* cited by examiner

*Primary Examiner*—Anthony J Green
(74) *Attorney, Agent, or Firm*—Anthony A. Bisulca

(57) ABSTRACT

A pigment preparation comprising a) at least one diketopyrrolopyrrole pigment of the formula (V) as a base pigment and b) at least one pigment dispersing agent based on sulphonated diketopyrrolopyrrole derivatives and the use thereof for the undistorted coloration of plastics

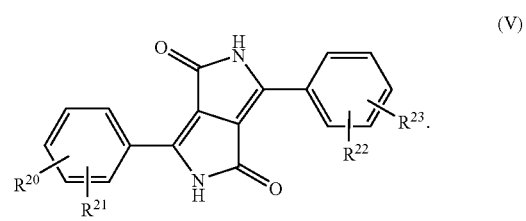

18 Claims, No Drawings

PIGMENT PREPARATIONS BASED ON DIKETOPYRROLOPYRROLE PIGMENTS FOR THE UNDISTORTED PIGMENTATION OF PARTIALLY CRYSTALLINE PLASTICS

This invention relates to pigment preparations based on diketopyrrolopyrrole pigments with diketopyrrolopyrrole-derived pigment dispersants for coloration of macromolecular material, particularly for warpage-free pigmentation of partly crystalline plastics, especially polyolefins.

The coloration of partly crystalline plastics with organic pigments frequently gives rise to warpage or distortion phenomena. The pigmentation of large-volume injection moldings, especially those composed of polyethylene, leads to deformation, shrinkage and cracking (internal stresses), rendering the colored articles unusable, depending on the field of application. Bottle crates, for example, are likely to become unstackable by loss of shape.

These disadvantages relate to the majority of organic pigments, whereas inorganic pigments and a minority of organic pigments behave neutrally. It is believed that pigments act as nucleation sites during the solidification of the polymer melt and thus lead to a polymer which is prone to warp/distort.

As well as providing warpage-free colorations, pigments used for coloration of plastics have to meet high performance requirements as pigments, such as good dispersibility, high color strength, clean hues of high chroma, high thermal fastness, good resistance to bleeding and good light and weather fastnesses. It would also be desirable for pigments to be useful not just for one system but ideally universally. Thus, pigments should also be suitable for non-partly-crystalline plastics and also for coloration of other macromolecular organic materials and be useful in, for example, coating or printing systems, where still other requirements have to be met, such as for example low viscosity for the grind formulations or for the ready-produced printing and coating colors, good flocculation resistance, solvent and overcoating fastnesses, high luster and, in the case of metallic coatings, high transparency.

Various methods have already been proposed to counteract the warpage problem. Warpage-free pigments are obtained according to U.S. Pat. No. 4,880,472 through silica- or alumina-coated pigments, according to EP 0 296 107 through ethylcellulose-coated pigments, according to EP 0 466 646 through pigments coated with polar polymers, according to DE 42 14 868 through ternary pigment preparations comprising a base pigment, a sulfonic acid and alkali metal sulfonate group modified organic pigment and a polymeric ammonium salt, according to DE 43 13 090 through organic pigments which have been exposed to a low temperature plasma, according to EP 659 840 by coating the pigment with phosphate complexes and according to EP 952 183 through use of diketopyrrolopyrroles having long-chain substituents.

DE 199 58 181 discloses 3,6-bis-([1,1'-biphenyl]-4-yl)-2,5-dihydro-pyrrolo(3,4-c)pyrrole-1,4-diones which are substituted by sulfonamide groups and are useful as pigment dispersants.

However, these methods do not always meet current requirements with regard to the performance characteristics described above. The present invention has for its object to find new ways to achieve warpage-free coloration of partly crystalline plastics with diketopyrrolopyrrole pigments.

We have found that this object is surprisingly achieved by a novel pigment preparation described hereinbelow.

The present invention accordingly provides a pigment preparation comprising a) at least one diketopyrrolopyrrole pigment of the formula (V) as a base pigment,

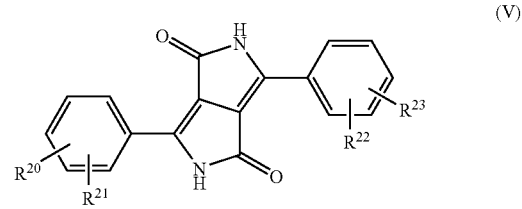

where
$R^{20}$, $R^{21}$, $R^{22}$ and $R^{23}$ are independently hydrogen, halogen, such as for example chlorine or bromine, $C_1$–$C_4$-alkyl, such as for example methyl, ethyl or tert-butyl, $C_1$–$C_4$-alkoxy, such as for example methoxy, cyano or phenyl;
and
b) at least one pigment dispersant of the formula (I),

where
$R^{31}$ is a radical of the formula (VI), (VIII) or (IX),
$R^{32}$ is a radical of the formula (VII),
s or t are a number from 0.1 to 4.0

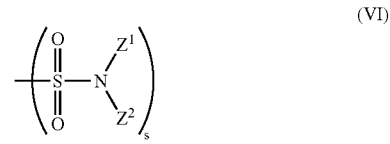

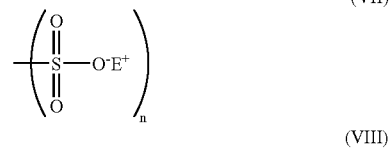

n is a number from 0 to 2, with the proviso that n is 0 when $R^{31}$ is a radical of the formula (VIII) or (IX), $E^+$ is $H^+$ or the equivalent $M^{m+}/m$ of a metal cation $M^{m+}$ from the 1st to 5th main group or from the 1st or 2nd or from the 4th to 8th transition group of the periodic table of chemical elements, m being one of 1, 2 or 3, such as for example $Li^{1+}$, $Na^{1+}$, $K^{1+}$, $Mg^{2+}$, $Ca^{2+}$, $Sr^{2+}$, $Ba^{2+}$, $Mn^{2+}$, $Cu^{2+}$, $Ni^{2+}$, $Co^{2+}$, $Zn^{2+}$, $Fe^{2+}$, $Al^{3+}$, $Cr^{3+}$ or $Fe^{3+}$; an ammonium ion $N^+R^9R^{10}R^{11}R^{12}$, where the substituents $R^9$, $R^{10}$, $R^{11}$ and $R^{12}$ are each independently a hydrogen atom, $C_1$–$C_{30}$-alkyl, $C_2$–$C_{30}$-alkenyl, $C_5$–$C_{30}$-cycloalkyl, phenyl, $(C_1$–$C_8)$-alkylphenyl, $(C_1$–$C_4)$-alkylenephenyl, for example benzyl, or a (poly)alkyleneoxy group of the formula —[CH($R^{80}$)—CH($R^{80}$)—O]$_k$—H, where k is a number from 1 to 30 and the two $R^{80}$ radicals are independently hydrogen, $C_1$–$C_4$-alkyl or, when k is >1, a combination thereof;

and wherein $R^9$, $R^{10}$, $R^{11}$ and/or $R^{12}$ alkyl, alkenyl, cycloalkyl, phenyl or alkylphenyl may each be substituted by amino, hydroxyl and/or carboxyl; or where the substituents $R^9$ and $R^{10}$ may combine with the quaternary nitrogen atom to form a five-, six- or seven-membered saturated ring system which if appropriate contains still further heteroatoms selected from the group consisting of O, S and N, for example of the pyrrolidone, imidazolidine, hexamethyleneimine, piperidine, piperazine or morpholine type;

or where the substituents $R^9$, $R^{10}$ and $R^{11}$ may combine with the quaternary nitrogen atom to form a five-, six- or seven-membered aromatic ring system which if appropriate contains still further heteroatoms selected from the group consisting of O, S and N and which has if appropriate additional rings fused onto it, for example of the pyrrole, imidazole, pyridine, picoline, pyrazine, quinoline or isoquinoline type;

or wherein $E^+$ defines an ammonium ion of the formula (Ic)

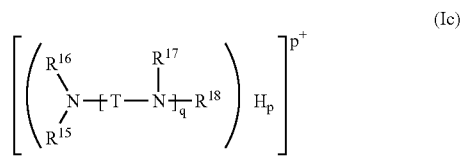

(Ic)

where
$R^{15}$, $R^{16}$, $R^{17}$ and $R^{18}$ are independently hydrogen or a (poly)alkyleneoxy group of the formula —[CH($R^{80}$)—CH($R^{80}$)O]$_k$—H, where k is a number from 1 to 30 and the two $R^{80}$ radicals are independently hydrogen, $C_1$–$C_4$-alkyl or, when k>1, a combination thereof;
q is a number from 1 to 10, preferably 1, 2, 3, 4 or 5;
p is a number from 1 to 5, subject to the proviso that p≦q+1;
T is a branched or unbranched $C_2$–$C_6$-alkylene radical; or where T when q is >1 may also be a combination of branched or unbranched $C_2$–$C_6$-alkylene radicals;
$Z^1$ and $Z^2$ are the same or different and are hydrogen or $C_1$–$C_{30}$-alkyl or $C_1$–$C_{30}$-alkenyl radicals which are linear or branched and unsubstituted or halogen, hydroxyl, hydroxycarbonyl or $C_1$–$C_6$-alkoxy-substituted, wherein the alkenyl radical may be singly or multiply unsaturated, with the proviso that $Z^1$ and $Z^2$ are not both hydrogen;

and
Q is a radical of a diketopyrrolopyrrole compound of the formula (Ia)

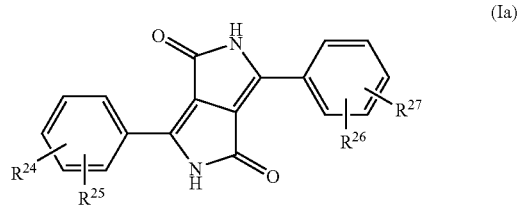

(Ia)

where $R^{24}$, $R^{25}$, $R^{26}$ and $R^{27}$ are independently hydrogen, halogen, such as for example chlorine or bromine, $(C_1$–$C_4)$-alkyl, such as for example methyl, ethyl or tert-butyl, $(C_1$–$C_4)$-alkoxy, such as for example methoxy, or cyano.

Particular interest pertains to pigment dispersants of the formula (I) where s or t are 0.2 to 3.0 and n is 0 to 0.5, especially pigment dispersants of the formula (I) where s or t is 0.5 to 2.5 and n is 0 to 0.2.

Particular interest further pertains to pigment dispersants of the formula (I) where
$Z^1$ and $Z^2$ are the same or different and are each $C_2$–$C_{16}$-alkyl,
$R^{24}$ and $R^{26}$ are each hydrogen and
$R^{25}$ and $R^{27}$ are each hydrogen, methyl, tert-butyl, chlorine or cyano.

The pigment dispersants of the present invention can be prepared by processes known to one skilled in the art.

By base pigment are meant diketopyrrolopyrrole pigments or mixtures of pigments comprising at least one diketopyrrolpyrrole pigment, which may also be present as conventional pigment preparations.

Particular interest pertains to diketopyrrolopyrrole base pigments of the formula (V) where
$R^{21}$ and $R^{23}$ are both hydrogen and
$R^{20}$ and $R^{22}$ are the same or different and each hydrogen, methyl, tert-butyl, chlorine, cyano or phenyl.

Preferred diketopyrrolopyrrole pigments useful as base pigments are for example C.I. Pigment Orange 71, 73, 81 and C.I. Pigment Red 254, 255, 264, 270, 272.

When the base pigment, as well as the diketopyrrolopyrrole pigment, comprises other pigments, these other pigments can be those listed in Colour Index International Fourth Edition Online.

The pigment preparations of the present invention, as well as the base pigment a) and the pigment dispersant b), may further comprise c) auxiliaries, such as for example surfactants, pigmentary and nonpigmentary dispersants, fillers, standardizers, resins, waxes, defoamers, antidust agents, extenders, shading colorants, preservatives, dryness retarders, rheology control additives, wetting agents, antioxidants, UV absorbers, light stabilizers or a combination thereof.

Preferred pigment preparations in the present invention consist essentially of
a) 50% to 99.9% by weight, preferably 55% to 99.5% by weight and more preferably 60% to 99% by weight of at least one base pigment according to a),
b) 0.1% to 25% by weight, preferably 0.5% to 20% by weight and more preferably 1% to 15% by weight of at least one, preferably one or two, pigment dispersant according to b),
c) 0% to 25% by weight and preferably 0% to 15% by weight of auxiliaries, the fractions of the respective components being based on the total weight of the preparation (100% by weight).

Useful surfactants include anionic or anion-active, cationic or cation-active and nonionic substances or mixtures of these agents.

Examples of suitable anion-active substances include fatty acid taurides, fatty acid N-methyltaurides, fatty acid isethionates, alkylphenylsulfonates, alkylnaphthalene-sulfonates, alkylphenol polyglycol ether sulfates, fatty alcohol polyglycol ether sulfates, fatty acid amide polyglycol ether sulfates, alkylsulfosuccinamates, alkenylsuccinic monoesters, fatty alcohol polyglycol ether sulfosuccinates, alkanesulfonates, fatty acid glutamates, alkylsulfosuccinates, fatty acid sarcosides; fatty acids, examples being palmitic, stearic and oleic acid; soaps, examples being alkali metal salts of fatty acids, naphthenic acids and resin acids, such as abietic acid, alkali-soluble resins, examples being rosin-modified maleate resins and condensation products based on cyanuric chloride, taurine, N,N'-diethylaminopropylamine and p-phenylenediamine. Particular preference is given to resin soaps, i.e., alkali metal salts of resin acids.

Examples of suitable cation-active substances include quaternary ammonium salts, fatty amine alkoxylates, alkoxylated polyamines, fatty amine polyglycol ethers, fatty amines, diamines and polyamines derived from fatty amines or fatty alcohols, and the alkoxylates of said amines, imidazolines derived from fatty acids, and salts of these cation-active substances, such as acetates, for example.

Examples of suitable nonionic substances include amine oxides, fatty alcohol polyglycol ethers, fatty acid polyglycol esters, betaines, such as fatty acid amide N-propyl betaines, phosphoric esters of aliphatic and aromatic alcohols, fatty alcohols or fatty alcohol polyglycol ethers, fatty acid amide ethoxylates, fatty alcohol-alkylene oxide adducts and alkylphenol polyglycol ethers.

By nonpigmentary dispersants are meant substances which in structural terms are not derived from organic pigments. They are added as dispersants either during the actual preparation of pigments or else in many cases during the incorporation of the pigments into the application media to be colored: for example, during the preparation of paints or printing inks by dispersing of the pigments into the corresponding binders. They may be polymeric substances, such as polyolefins, polyesters, polyethers, polyamides, polyimines, polyacrylates, polyisocyanates, block copolymers thereof, copolymers of the corresponding monomers or polymers of one class modified with a few monomers of a different class. These polymeric substances carry polar anchor groups such as hydroxyl, amino, imino and ammonium groups, carboxylic acid and carboxylate groups, sulfonic acid and sulfonate groups or phosphonic acid and phosphonate groups, for example, and can also be modified with aromatic nonpigmentary substances. Nonpigmentary dispersants may additionally be aromatic substances modified chemically with functional groups but not derived from organic pigments. Nonpigmentary dispersants of this kind are known to the skilled worker and in some cases are available commercially (e.g., Solsperse®, Avecia; Disperbyk®, Byk-Chemie, Efka®, Efka). A number of types will be mentioned below as representatives; however, it is possible in principle to use any desired other substances described, examples being condensation products of isocyanates and alcohols, diols or polyols, amino alcohols or diamines or polyamines, polymers of hydroxy carboxylic acids, copolymers of olefin monomers or vinyl monomers and ethylenically unsaturated carboxylic acids and esters, urethane-containing polymers of ethylenically unsaturated monomers, urethane-modified polyesters, condensation products based on cyanuric halides, polymers containing nitroxyl compounds, polyesteramides, modified polyamines, modified acrylic polymers, dispersants with comblike structure formed from polyesters and acrylic polymers, phosphoric esters, polymers derived from triazine, modified polyethers, or dispersants derived from aromatic, nonpigmentary substances. These base structures are in many cases modified further, by means for example of chemical reaction with further substances which carry functional groups, or by formation of salts.

By pigmentary dispersants are meant pigment dispersants which derive from an organic pigment as base structure and are prepared by chemical modification of said base structure; examples include saccharine-containing pigment dispersants, piperidyl-containing pigment dispersants, naphthalene- or perylene-derived pigment dispersants, pigment dispersants containing functional groups linked to the pigment base structure via a methylene group, pigment base structures modified chemically with polymers, pigment dispersants containing sulfo acid groups, sulfonamide groups or sulfo acid ester groups, pigment dispersants containing ether or thioether groups, or pigment dispersants containing carboxylic acid, carboxylic ester or carboxamide groups.

The pigment preparations of the present invention can be used as preferably aqueous presscakes, but generally they are solid systems of free-flowing, pulverulent consistency or they are granules.

The warpage amelioration achievable according to the present invention is believed to be due to a modification of the surface structure of the base pigments via the pigment dispersant. There are a whole series of cases where the efficacy of the pigment dispersant, and the quality of the pigment preparations produced thereby, are dependent on the time of addition of the pigment dispersant in the base pigment's manufacturing operation. When two or more pigment dispersants are used, they may be added at the same time or at different times or may be mixed before being added.

The efficacy of the pigment dispersant may also depend on its particle size and particle shape and also on the percentage of the pigment surface which is coatable. It may be preferable for the pigment dispersant to be added to the base pigment only in the contemplated application medium. The respective optimum concentration for the pigment dispersant has to be determined in preliminary, exploratory tests, since the improvement in the properties of the base pigments does not always correlate linearly with the amount of pigment dispersant.

The pigment preparations of the present invention may be mixtures of one or more, preferably 1, 2 or 3, base pigments with one or more, preferably 1 or 2, pigment dispersants.

The present invention also provides a process for producing a pigment preparation according to the present invention, said process comprising the pigment dispersant or dispersants and the base pigment or pigments being mixed with each other or being allowed to act on each other during the manufacturing operation. The manufacturing operation of a diketopyrrolopyrrole pigment comprises its synthesis, fine division and/or dispersion, for example by grinding, kneading or reprecipitating, if appropriate finishing, and also isolation as a presscake or as a dry granulate or powder. For example, the pigment dispersant may be added before, during or after one of the customary processing steps such as for example synthesis, fine-dividing operation, finishing, isolating, drying or pulverizing. For instance, addition at as early a stage as the synthesis can lead to fine particles. It will be appreciated that the pigment dispersant may be also be added in subdivided portions at different times.

When the pigment dispersant is added in the course of a fine-dividing operation, it is added for example before or during salt kneading, before or during dry grinding of a crude pigment or before or during wet grinding of a crude pigment. It will be similarly advantageous to add the pigment dispersant before or after finishing of the base pigment in an aqueous or aqueous-organic medium at any desired pH or in an organic medium.

The pigment dispersant may also be added to the preferably water-moist pigment presscake prior to drying and incorporated, in which case the pigment dispersant itself may likewise be present as a presscake. It is further possible to effect dry mixes of powder or granulate of the pigment dispersant with the powder or granulate of the base pigment, or to achieve the mixing in the course of a grinding or pulverization of the base pigment and of the pigment dispersant.

The pigment preparations of the present invention can be used for pigmentation of macromolecular organic materials of natural or synthetic origin, for example of plastics, resins, coatings, paints or electrophotographic toners and developers, and also of inks, including printing inks.

Examples of macromolecular organic materials which can be pigmented with the pigment preparations mentioned include cellulose ethers and cellulose esters, such as ethylcellulose, nitrocellulose, cellulose acetate or cellulose butyrate, natural resins or synthetic resins, such as addition-polymerization resins or condensation resins, examples being amino resins, especially urea-formaldehyde and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, silicone and silicone resins, individually or in mixtures.

It is irrelevant whether the aforementioned high molecular mass organic compounds are in the form of plastic masses, melts or in the form of spinning solutions, varnishes, paints or printing inks. Depending on the intended use it is found advantageous to utilize the pigments obtained in accordance with the invention in the form of a blend or in the form of preparations or dispersions. Based on the high molecular mass organic material to be pigmented, the pigment preparations of the invention are used in an amount of from 0.05 to 30% by weight, preferably from 0.1 to 15% by weight.

The pigment preparations of the invention are also suitable as colorants in electrophotographic toners and developers, such as one- or two-component powder toners (also called one- or two-component developers), magnetic toners, liquid toners, polymerization toners and specialty toners, for example.

Typical toner binders are addition-polymerization resins, polyaddition resins and polycondensation resins, such as styrene, styrene-acrylate, styrene-butadiene, acrylate, polyester and phenol-epoxy resins, polysulfones, polyurethanes, individually or in combination, and also polyethylene and polypropylene, which may already include, or be modified subsequently with, further ingredient additions, such as charge control agents, waxes, or flow assistants.

The pigment preparations of the invention are further suited to application as colorants in powders and powder coating materials, particularly in triboelectrically or electrokinetically sprayable powder coating materials which are employed to coat the surfaces of articles made, for example, from metal, wood, plastic, glass, ceramic, concrete, textile material, paper or rubber.

Resins used as powder coating resins are typically epoxy resins, carboxyl- and hydroxyl-containing polyester resins, polyurethane resins and acrylic resins, together with customary curatives. Resin combinations also find use. Thus, for example, epoxy resins are frequently employed in combination with carboxyl- and hydroxyl-containing polyester resins. Typical curative components (depending on the resin system) are, for example, acid anhydrides, imidazoles and also dicyandiamide and its derivatives, blocked isocyanates, bisacylurethanes, phenolic and melamine resins, triglycidyl isocyanurates, oxazolines and dicarboxylic acids.

The pigment preparations of the invention are also suitable for use as colorants in ink-jet inks, on both an aqueous and a non aqueous basis, and also in those inks which operate in accordance with the holt-melt process.

Ink-jet inks generally contain a total of from 0.5 to 15% by weight, preferably 1.5 to 8% by weight (calculated on a dry basis) of one or more of the pigment preparations of the invention.

Microemulsion inks are based on organic solvents, water and, if desired, an additional hydrotropic substance (interface mediator).

Microemulsion inks generally contain from 0.5 to 15% by weight, preferably from 1.5 to 8% by weight, of one or more of the pigment preparations of the invention, from 5 to 99% by weight of water and from 0.5 to 94.5% by weight of organic solvent and/or hydrotropic compound.

Solvent-based ink-jet inks contain preferably from 0.5 to 15% by weight of one or more of the pigment preparations of the invention, from 85 to 99.5% by weight of organic solvent and/or hydrotropic compounds.

Hot-melt inks are generally based on waxes, fatty acids, fatty alcohols or sulfonamides which are solid at room temperature and become liquid on heating, the preferred melting range being situated between about 60° C. and about 140° C. Hot-melt ink-jet inks are composed essentially, for example, of from 20 to 90% by weight of waxes and from 1 to 10% by weight of one or more of the pigment preparations of the invention. Additionally it is possible for them to contain from 0 to 20% by weight of an additional polymer (as "dye dissolver"), from 0 to 5% by weight of dispersing assistant, from 0 to 20% by weight of viscosity modifier, from 0 to 20% by weight of plasticizer, from 0 to 10% by weight of tack additive, from 0 to 10% by weight of transparency stabilizer (which prevents, for example, crystallization of the waxes) and from 0 to 2% by weight of antioxidant. Typical additives and auxiliaries are described for example in U.S. Pat. No. 5,560,760.

Additionally the pigments prepared in accordance with the invention are also suitable for use as colorants for color filters, for both additive and subtractive color generation, and also for electronic inks.

The pigment preparations of the present invention are useful for calibration of partly crystalline plastics. The present invention accordingly further provides for the use of the above-described pigment preparation of the present invention for warpage-free mass pigmentation of partly crystalline plastics.

As used herein, the term "warpage-free" is to be understood as meaning a degree of warpage which is distinctly reduced compared with the untreated pigment.

Partly crystalline plastics is to be understood as referring to those which solidify to form small crystalline nuclei or aggregates, including those which do so only in the presence of nucleating agents (organic pigments for example). Partly crystalline plastics are generally thermoplastic macromolecular organic materials having a molecular weight ($M_w$) of $10^4$ to $10^8$ g/mol, preferably $10^5$ to $10^7$ g/mol, and a crystallinity ($X_c$) of 10 to 99.9%, preferably of 40 to 99% and more preferably of 80 to 99%. Preferred partly crystalline plastics are homopolymers, block or random copolymers and terpolymers of ethylene, propylene, butylene, styrene and/or divinylbenzene, especially polyolefins, such as polyethylene (HDPE, MDPE, LDPE), polypropylene, especially high density polyethylene (HDPE), also polystyrene, PVC, polyesters, such as polyethylene terephthalate, and polyamides, such as nylon 6 and nylon 66, and thermoplastic ionomers. The partly crystalline plastics may further comprise additives in customary amounts, examples being stabilizers, optical brighteners, fillers and lubricants.

When used for coloration of partly crystalline plastics, the phthalocyanine pigment treated according to the present invention will advantageously be used in an amount of 0.01% to 5% by weight and preferably 0.05% to 1% by weight, based on the plastic. The coloration step can be carried out according to customary methods, as by extrusion for example.

The influence on the warpage propensity of polyolefin by the pigment produced according to the present invention is tested on a ready-produced injection molding in the form of a plaque. After aging, the dimensions of the plaque (length, width) are measured and the degree of warpage is determined.

The pigment preparations of the present invention possess an ameliorated DIN EN 20105-A03 bleed resistance and an enhanced DIN EN 12877 thermal stability compared with mixtures described in EP 952 183.

In the examples which follow percentages are by weight, unless otherwise stated.

EXAMPLE 1

13.5 parts of P.R.254 prepared by the process disclosed in EP 94 911 are suspended in a mixture of 150 parts of water and 150 parts of tert-amyl alcohol. Addition of 1.5 parts of pigment dispersant of the formula (X)

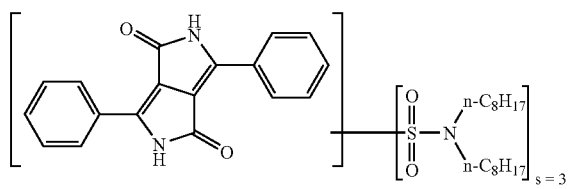

prepared according to Example 4, is followed by adjustment to pH 5 with acetic acid and stirring at 85° C. for 10 hours. The amyl alcohol is removed by steam distillation, the suspension is filtered, the presscake is washed with water, dried at 80° C. and ground to give 13.6 parts of pigment preparation.

The pigment preparation is used to pigment polyethylene plaques (600 g of ®Novolen and 0.6 g of pigment preparation) and warpage is determined.

Method: Shrinkage testing of organic pigments in injection-molded polyethylene. A rectangular plaque is molded with film gate and the dimensions 60 by 60 mm. Evaluation is by measurement along and across the direction of molding. For each pigment tested 10 moldings were produced and measured out, the respective average value being employed. The control used is 10 moldings from nonpigmented plastic. It is very important in this connection that this material experience exactly the same processing history as the pigmented system.

The polyethylene plaques pigmented with the pigment preparation of the present invention have a distinctly lower warpage value than the above P.R.254 without pigment dispersant.

EXAMPLE 2

Comparative

When P.R.254, prepared by the process disclosed in EP 94911, is treated with the DE 19958181 pigment dispersant, prepared according to Example 10a, the pigment preparation is associated with a significantly greater warpage than the inventive pigment preparation of Example 1.

EXAMPLE 3

Comparative

The P.R 254 Chromophtal Red 2028 additized with the pigment dispersant of EP 952183 has a lower DIN EN 20105-A03 bleed resistance at 4 than the inventive pigment preparation of Example 1, which has a bleed resistance of 4–5.

EXAMPLE 4

50 parts of a commercially available P.R.255 are introduced into 500 parts of chlorosulfonic acid and stirred at 80° C. for 3 hours. After cooling to 50° C., 53.8 parts of thionyl chloride are added dropwise before stirring at 60° C. for 2 hours. After cooling to room temperature, the mixture is poured onto a mixture of 400 parts of water and 800 parts of ice, the suspension is filtered, the presscake is washed with ice-water and suspended in 1000 parts of water. This is followed by stirring under reflux for 3 hours, addition of 300 parts of 33% hydrochloric acid at 60° C., cooling to 15° C., filtration and washing with 10% hydrochloric acid. 69 parts of the presscake are introduced into 700 parts of toluene and the water is distilled off. At 50° C., 26.9 parts of thionyl chloride are added dropwise over 30 minutes. This is followed by stirring at 55° C. for 2 hours before excess thionyl chloride is distilled off at 50° C. under reduced pressure. Then 83.8 parts of dioctylamine are added before stirring at 60° C. for 2 hours. The suspension is filtered, washed with toluene, ethanol and water and the presscake is dried at 80° C. to give 32.4 parts of pigment dispersant of the formula (X).

EXAMPLE 5

6.8 parts of DPP derivative of the formula (XI)

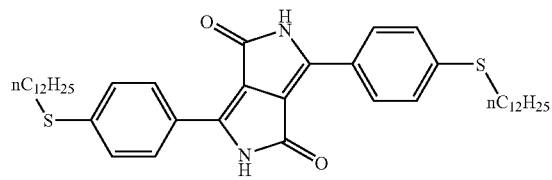

are introduced into 100 parts of glacial acetic acid and oxidized at 10° C. by dropwise addition of 4.9 parts of 35% hydrogen peroxide. The dropwise addition is followed by stirring at room temperature for 4 hours before the mixture is poured onto 120 parts of ice-water. The product is filtered, washed and dried to leave 5.9 parts of pigment dispersant of the formula (XII).

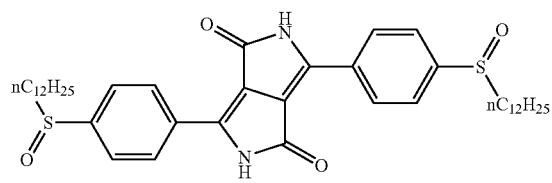

EXAMPLE 6

95 parts of P.R.254 are mixed with 5 parts of pigment dispersant of the formula (XII), prepared as per Example 5. Strong colorations having a clean hue are obtained in polyethylene. The warpage of polyethylene plaques pigmented with this mixture is distinctly reduced.

EXAMPLE 7

3.46 parts of DPP derivative of the formula (XII) are introduced into 265 parts of methylene chloride and cooled down to 0° C. A solution of 2.73 parts of 70% 3-chloroperbenzoic acid in 93 parts of methylene chloride is added dropwise at 0° C. over 20 minutes. This is followed by stirring at room temperature for 5 hours, two washes with 10% aqueous sodium sulfide solution and distillative removal of methylene chloride to leave 1.8 parts of pigment dispersant of the formula (XIII).

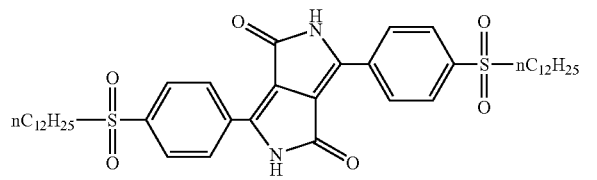

(XIII)

EXAMPLE 8

95 parts of P.R.254 are mixed with 5 parts of pigment dispersant prepared as per Example 7. Strong colorations having a clean hue are obtained in polyethylene. The warpage of polyethylene plaques pigmented with this mixture is distinctly reduced.

EXAMPLE 9a 40 parts of P.R.255 are added to 160 parts of 20% oleum before stirring at 5 to 10° C. for 15 min. 120 parts of chlorosulfonic acid are added dropwise before stirring at 10° C. for 6 hours. The mixture is poured onto 1000 parts of ice-water, the sulfochloride is filtered off with suction, washed with water and then with acetone and dried.

EXAMPLE 9b

A mixture of 50.5 parts of a 30% aqueous presscake of P.R.254, 7 parts of water, 42.5 parts of tert-amyl alcohol and 0.79 parts of sulfochloride prepared according to Example 9a is adjusted to pH 12 with 33% aqueous sodium hydroxide solution and then stirred under reflux for 30 min to hydrolyze the sulfochloride to sulfonic acid. Then 5.8 parts of 30% aqueous solution of cetyltrimethylammonium chloride are added before stirring under reflux for a further 30 min. After pH 4.5 has been set with acetic acid, the mixture is stirred under reflux for another 1 hour. The pigment preparation consisting of P.R.254 and the pigment dispersant which comes within the formula (VII) and consists of the salt of the deprotonated sulfonic acid of P.R.255 and the cetyltrimethylammonium used is filtered off with suction, washed and dried.

EXAMPLE 9c

The polyethylene plaques colored with the pigment preparation produced according to Example 9b show distinctly reduced warpage.

We claim:

1. A pigment preparation comprising
a) at least one base pigment, wherein the at least one base pigment is at least one diketopyrrolopyrrole pigment of the formula (V),

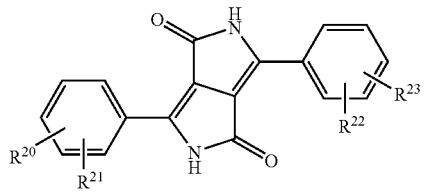

(V)

where
$R^{20}$, $R^{21}$, $R^{22}$ and $R^{23}$ are independently hydrogen, halogen, $C_1$–$C_4$-alkyl, $C_1$–$C_4$-alkoxy, cyano or phenyl; and b) at least one pigment dispersant of the formula (I),

(I)

where
$R^{31}$ is a radical of the formula (VI), (VIII) or (IX),
$R^{32}$ is a radical of the formula (VII),
s or t is a number from 0.1 to 4.0

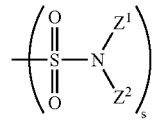

(VI)

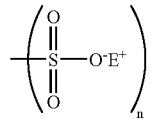

(VII)

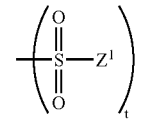

(VIII)

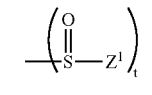

(IX)

n is a number from 0 to 2, with the proviso that n is 0 when $R^{31}$ is a radical of the formula (VIII) or (IX), $E^+$ is $H^+$ or the equivalent $M^{m+}/m$ of a metal cation $M^{m+}$ from the 1st to 5th main group or from the 1st, 2nd or 4th to 8th transition group of the periodic table of chemical elements, m being one of 1, 2 or 3; an ammonium ion $N^{+R9}R^{10}R^{11}R^{12}$, wherein $R^9$, $R^{10}$, $R^{11}$ and $R^{12}$ are each independently a hydrogen atom, $C_1$–$C_{30}$-alkyl, $C_2$–$C_{30}$-alkenyl, $C_5$–$C_{30}$-cycloalkyl, phenyl, ($C_1$–$C_8$)-alkylphenyl, ($C_1$–$C_4$)-alkylenephenyl, or a (poly)alkyleneoxy group of the formula —[CH($R^{80}$)—CH($R^{80}$)—O]$_k$—H, where k is a number from 1 to 30 and each $R^{80}$ is independently hydrogen, $C_1$–$C_4$-alkyl or, when k is >1, a combination thereof;

and wherein the $C_1$-C30-alkyl, $C_2$–$C_{30}$-alkenyl, $C_5$–$C_{30}$-cycloalkyl, phenyl or ($C_1$–$C_8$)-alkylphenyl are optionally substituted by amino, hydroxyl and/or carboxyl;

or the substituents $R^9$ and $R^{10}$ combine with the quaternary nitrogen atom to form a five-, six- or seven-membered saturated ring system optionally containing additional heteroatoms selected from the group consisting of O, S and N;

or the substituents $R^9$, $R^{10}$ and $R^{11}$ combine with the quaternary nitrogen atom to form a five-, six- or seven-membered aromatic ring system optionally containing additional heteroatoms selected from the group consisting of O, S and N and optionally, has additional rings fused thereon;

or wherein $E^+$ is an ammonium ion of the formula (Ic)

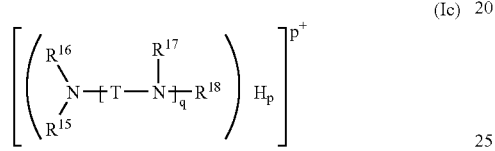

wherein $R^{15}$, $R^{16}$, $R^{17}$ and $R^{18}$ are independently hydrogen or a (poly)alkyleneoxy group of the formula —[CH($R^{80}$)—CH($R^{80}$)O]$_k$—H, where k is a number from 1 to 30 and each $R^{80}$ is independently hydrogen, $C_1$–$C_4$-alkyl or, when k>1, a combination thereof;

q is a number from 1 to 10;

p is a number from 1 to 5, subject to the proviso that p≦q+1;

T is a branched or unbranched $C_2$–$C_6$-alkylene radical; or when q is ≦1 T is optionally a combination of branched or unbranched $C_2$–$C_6$-alkylene radicals;

$Z^1$ and $Z^2$ are the same or different and are hydrogen or $C_1$–$C_{30}$-alkyl linear or branched $C_1$–$C_{30}$-alkenyl linear or branched, wherein the $C_1$–$C_{30}$-alkyl and $C_1$–$C_{30}$-alkenyl are unsubstituted or halogen, hydroxyl, hydroxycarbonyl or $C_1$–$C_6$-alkoxy-substituted, wherein the $C_1$–$C_{30}$alkenyl radical is optionally singly or multiply unsaturated, with the proviso that $Z^1$ and $Z^2$ are not both hydrogen;

and

Q is a radical of a diketopyrrolopyrrole compound of the formula (Ia)

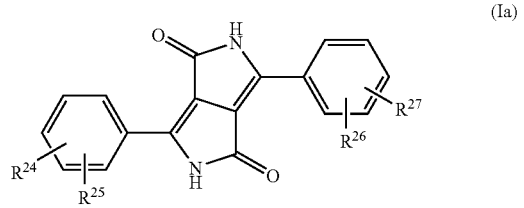

where $R^{24}$, $R^{25}$, $R^{26}$ and $R^{27}$ are independently hydrogen, halogen, ($C_1$–$C_4$)-alkyl, ($C_1$–$C_4$)-alkoxy or cyano.

2. The pigment preparation according to claim 1 wherein s or t is 0.2 to 3.0.

3. The pigment preparation according to claim 1 wherein $Z^1$ and $Z^2$ are the same or different and are each $C_2$–$C_{16}$-alkyl, $R^{24}$ and $R^{26}$ are each hydrogen and $R^{25}$ and $R^{27}$ are each hydrogen, methyl, tert-butyl, chlorine or cyano.

4. The pigment preparation according to claim 1, wherein the base pigment of the formula (V) has $R^{21}$ and $R^{23}$ both hydrogen and $R^{20}$ and $R^{22}$ the same or different and each hydrogen, methyl, tert-butyl, chlorine, cyano or phenyl.

5. The pigment preparation according to claim 1, wherein the base pigment is C.I. Pigment Orange 71, 73, 81, C.I. Pigment Red 254, 255, 264, 270 or 272.

6. The pigment preparation according to claim 1, consisting essentially of a) 50% to 99.9% by weight of at least one base pigment, b) 0.1% to 25% by weight of at least one pigment dispersant, and c) 0% to 25% by weight of at least one auxiliary, the fractions of the respective components being based on the 100% weight of the preparation.

7. The pigment preparation according to claim 1, wherein n is 0 to 0.5.

8. A process for producing a pigment preparation according to claim 1, comprising the step of adding the at least one pigment dispersant to the at least one base pigment during the manufacture of the at least base pigment, wherein the manufacture of the at least one pigment includes:

synthesizing the at least one base pigment, dividing the at least one base pigment, dispersing the at least one base pigment, and isolating the at least one pigment.

9. The process according to claim 8, wherein the manufacture of the at least one pigment further comprises finishing the at least one base pigment.

10. The process according to claim 8, wherein the isolating step of the manufacture of the at least one base pigment further comprises forming the at least one base pigment into a presscake, dry granulate or powder.

11. A pigmented composition comprising a pigment preparation according to claim 1.

12. The pigmented composition according to claim 11, wherein pigmented composition is selected from the group consisting of plastics, resins, coatings, paints electrophotographic toners electrophotographic developers and inks.

13. The pigmented composition according to claim 11, wherein the pigmented composition is a printing ink.

14. A process for warpage-free mass pigmentation of a partly crystalline plastic comprising the step of adding a pigment preparation according to claim 1 to the partly crystalline plastic during the manufacture of the partly crystalline plastic.

15. The process according to claim 14 wherein the partly crystalline plastic is a homopolymer, block copolymer, random copolymer or terpolymer of ethylene, propylene, butylene, styrene, divinylbenzene or mixtures thereof.

16. The process according to claim 14 wherein the partly crystalline plastic is a polyethylene, polypropylene, polystyrene, PVC, polyester, polyamide or a thermoplastic ionomer.

17. The process according to claim 14, wherein the partly crystalline plastic is HDPE, MDPE, LDPE, polyethylene terephthalate, nylon 6 or nylon 66.

18. A partly crystalline plastic made in accordance with the process of claim 15.

* * * * *